US010767873B2

(12) United States Patent
Ronda et al.

(10) Patent No.: US 10,767,873 B2
(45) Date of Patent: Sep. 8, 2020

(54) AIR PROCESSING SYSTEM AND METHOD

(71) Applicant: KONINKLIJKE PHILIPS N.V., Eindhoven (NL)

(72) Inventors: Cornelis Reinder Ronda, Eindhoven (NL); Koray Karakaya, Eindhoven (NL); Michiel Johannes Jongerius, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 99 days.

(21) Appl. No.: 15/741,410

(22) PCT Filed: Jun. 28, 2016

(86) PCT No.: PCT/EP2016/064927
§ 371 (c)(1),
(2) Date: Jan. 2, 2018

(87) PCT Pub. No.: WO2017/005531
PCT Pub. Date: Jan. 12, 2017

(65) Prior Publication Data
US 2018/0372330 A1 Dec. 27, 2018

(30) Foreign Application Priority Data
Jul. 6, 2015 (EP) .................................... 15175552

(51) Int. Cl.
*F24C 15/20* (2006.01)
*F24C 7/08* (2006.01)
(Continued)

(52) U.S. Cl.
CPC ............ *F24C 15/2021* (2013.01); *F24C 7/08* (2013.01); *F24C 7/081* (2013.01); *F24C 15/20* (2013.01);
(Continued)

(58) Field of Classification Search
CPC ........ F24C 15/2021; F24C 7/08; F24C 7/081; F24C 15/20; F24F 3/1603; F24F 7/007;
(Continued)

(56) References Cited

U.S. PATENT DOCUMENTS 9,989,507 B2 * 6/2018 Benn ...................... G01K 13/00
2005/0224069 A1 10/2005 Patil
(Continued)

FOREIGN PATENT DOCUMENTS

CN 1821779 A 8/2006
CN 203336773 U 12/2013
(Continued)

*Primary Examiner* — Thomas C Lee
*Assistant Examiner* — Anzuman Sharmin

(57) ABSTRACT

An air processing system comprises an air purifier (10) and/or an air quality sensor (12). One or both is controlled (14), or else sensor information is interpreted, in dependence on activity status information received from a plurality of home appliances (16, 8, 20, 22). This enables the operational life time of components in system to be extended, specifically the sensors and/or air purifier filters. Alternatively or additionally, it enables the air quality sensor information to be interpreted more reliably.

20 Claims, 1 Drawing Sheet

(51) Int. Cl.
  *F24F 7/007* (2006.01)
  *F24F 3/16* (2006.01)
  *G05B 15/02* (2006.01)
  *G05B 19/418* (2006.01)
  *F24F 11/00* (2018.01)

(52) U.S. Cl.
  CPC ............ *F24F 3/1603* (2013.01); *F24F 7/007* (2013.01); *G05B 15/02* (2013.01); *F24F 11/0001* (2013.01); *G05B 19/4185* (2013.01); *G05B 2219/2642* (2013.01)

(58) Field of Classification Search
  CPC . F24F 11/0001; G05B 15/02; G05B 19/4185; G05B 2219/2642
  See application file for complete search history.

(56) References Cited

U.S. PATENT DOCUMENTS

| | | | |
|---|---|---|---|
| 2006/0234621 A1* | 10/2006 | Desrochers | F24F 3/044 454/239 |
| 2007/0082601 A1* | 4/2007 | Desrochers | F24F 3/044 454/256 |
| 2008/0091284 A1 | 4/2008 | Sugiyama | |
| 2011/0076185 A1 | 3/2011 | Hammond | |
| 2011/0125329 A1 | 5/2011 | Oswald | |
| 2011/0284091 A1* | 11/2011 | Livchak | F24C 15/2021 137/2 |
| 2012/0256009 A1 | 10/2012 | Mucignat | |
| 2015/0108119 A1 | 4/2015 | Armstrong | |
| 2015/0153317 A1 | 6/2015 | Krebs | |
| 2016/0359325 A1* | 12/2016 | Kawata | G16H 40/67 |

FOREIGN PATENT DOCUMENTS

| | | |
|---|---|---|
| CN | 104075753 A | 10/2014 |
| CN | 204147307 U | 2/2015 |
| CN | 104596580 A | 5/2015 |
| EP | 1990080 A1 | 11/2008 |
| EP | 2292981 A2 | 3/2011 |
| JP | H0576715 | 3/1993 |
| JP | H10165738 | 6/1998 |
| JP | 2002147764 | 5/2002 |
| JP | 2010022703 | 2/2010 |
| JP | 2010281517 | 12/2010 |
| JP | 2014142164 | 8/2014 |
| JP | 2015010735 | 1/2015 |
| KR | 100824431 B1 | 4/2008 |
| WO | 2006099337 A2 | 9/2006 |
| WO | 2008065332 A2 | 6/2008 |
| WO | 2011149293 A2 | 12/2011 |

* cited by examiner

AIR PROCESSING SYSTEM AND METHOD

This application is the U.S. National Phase application under 35 U.S.C. § 371 of International Application No. PCT/EP2016/064927, filed on Jun. 28, 2016, which claims the benefit of International Application No. 15175552.7 filed on Jul. 6, 2015. These applications are hereby incorporated by reference herein.

FIELD OF THE INVENTION

This invention relates to an air processing system and method, for example a home air treatment system and method.

BACKGROUND OF THE INVENTION

US2015153317 discloses software that can be used to combine data from local, inexpensive dust sensors (particle counters) with Internet-available rich data on pollutants, weather, optional household devices, sensors, and appliances to create a rich picture of the local environment, shape that environment through non-trivial control of said household appliances and ventilation systems to reduce buildup of household dust on surfaces or reduce sensitive individuals' exposure to specific pollutants, and monitor individuals' exposure to pollutants. The software might live in a smartphone, related hardware devices (such as a pollution sensor communicating via bluetooth with the smartphone) or in heating/cooling control system such as a common household thermostat. In particular, advanced control of windows or inexpensive air filters within a common forced air climate system to mitigate air pollution inexpensively are envisioned. The author envisions an electronic home control system that would monitor indoor dust levels (by means of aforementioned inexpensive dust sensor means) and outdoor dust awareness (either by inexpensive outdoor dust sensors, or by obtaining the information over the Internet) to detect indoor pollution (e.g., caused by a dishwasher) or anticipate the pollution (by notification from the appliance that it is about to operate), open the window whenever the sensed or anticipated indoor air pollution exceeds the sensed or modeled outdoor air pollution, and close the window once indoor air quality has been equalized with outdoor air quality.

US20150108119 relates to microwave appliances and methods for operating microwave appliances. The specification describes a microwave appliance with features for indicating a need for an air filter change and a microwave appliance with features that reduce the risk of prolonged air filter use.

Indoor air pollution is a very serious topic in many parts of the world. Air purifiers are applied widely to deal with this challenge.

Part of the indoor pollution is generated indoors, such as some volatile organic compounds (VOCs). Examples are formaldehyde from furniture, and benzene from decoration materials. Particulate air pollution also arises, for example, from cooking and ironing, but also from peeling an orange or lighting and burning candles or cigarettes. In addition, particulate air pollution also enters homes from outdoors.

It is known to provide an air treatment system which combines sensing of the air quality by one or more sensors and also air purification, using one or more filters. The air purification may be controlled in dependence on the sensing results, to maintain desired air quality levels.

In many cases, indoor activities not only cause problems for a householder as a result of the deteriorated air quality, but also there may be a reduction in the operational lifetime of the filters used in an air purifier. For example, frying results in oily particles that can clog activated carbon filters. Similarly, there may be a reduction in the operational lifetime or performance of the sensors used within the system.

The sensors may for example comprise particle sensors for measuring the level of particulate pollution in the air. These may be based on the measurement of light scattered by the particles that pass along with an air flow through a detection volume in the sensor. The optical components can become adversely affected by the deposition of particulate or VOC deposits over time, so that the lifetime of the sensor is reduced.

Air quality sensors do not have perfect selectivity, in that they may respond to analytes other than those which are designed to be detected. This is particularly the case for low cost sensors. However, the use of low cost sensors is important, particularly in a system which has many sensors networked together.

SUMMARY OF THE INVENTION

There is therefore a need for a way to extend the lifetime of the sensors and/or air purifier filters in a home environment situation.

The invention is defined by the independent claims. The dependent claims define advantageous embodiments.

Throughout the description reference is made to "air processing system" or "home air processing system". These are systems that process the air, for example, in a home environment. Processing air may relate to filtering of the the air. Processing air may also relate to performing a sensing operation on the air. For example, detecting a type of gas or particle in the air.

According to examples in accordance with an aspect of the invention, there is provided an air processing system comprising a controller for controlling the air processing system, wherein the controller comprises an input adapted to receive activity status information from a plurality of home appliances, the controller being arranged for determining from the activity status information operational settings of the air processing system and further arranged for controlling or operating the air processing device at the determined operational settings. Thus, the air processing system is controlled in dependence on the activity status information to, for example, extend the lifetime of the air processing device. The air processing system may also be controlled in dependence on the activity status information to, for example, adapt a filtration action of the air processing system to the activity status information.

In an embodiment, the controller is arranged to control the operation of an air purifier, when it is part of the air processing system, by any one of the following: operate the air purifier and/or operate the air quality sensor; and/or interpret the air quality sensor information. For example, operating the air processing system using the determined operational settings comprises any one of the following: switching on the air purifier; switching off the air purifier; increasing the air flow through the air purifier; and reducing the air flow through the air purifier.

Current air purification and sensing solutions have limited awareness of what is happening in the ambient surroundings in which they are applied. For example, ironing results in the generation and emission of many particles, and cooking or frying results in the generation and emission of oily or fatty particles. This results in undesired health effects, and additionally it may also significantly reduce the operational life time of components in the air processing system, specifically the sensors and air purifier filters. In practice, the air quality sensors and the air purifier may be comprised in a single unit. The processing may comprise sensing targets in the air or filtering the air, The invention makes use of communication of the activity of home domestic appliances to the overall controller of an air quality sensor and/or air purifier. In this way, they are networked as part of the home air processing system to provide communication between many devices.

As soon as an appliance is in use, it may for example communicate this to the controller. Based on the local circumstances as determined by the air quality sensor (which may be a particle sensor and/or a total volatile organic compound (TVOC), sensor and/or other sensors that measure at least one parameter related to air quality), automatic actions can then be taken, preferably with the aim of being automated for choosing the most appropriate action type, for example with a focus on extending the lifetime of the components of the system. This may involve switching sensors off, changing the sampling rate (e.g. duty cycle) and/or sample air volume, using a special section of the air purification filter optimized for a certain type of pollutant class, and selecting the most appropriate cleaning action between available air treatment action choices. All of these actions can be considered as aspects of "operating" the air quality sensor or air purifier. Thus "operating" is to include turning on or off, or controlling any available settings. The system may in addition indicate to the consumer which activity is being detected and what actions are being taken. The air purifier may be switched off, or alternatively ramped up in operation, for example by increasing the air flow through the purifier.

Alternatively, or additionally, the way the sensor readings are interpreted may be adjusted based on the known appliance being used. In this case, the aim is to improve the accuracy and/or reliability of sensor readings. For example, a sensor for detecting a first pollutant may generate a signal which is known to be caused by a particular second pollutant (due to cross sensitivity) because a device which generates that second pollutant is known to be in use. Thus, the sensor signal can be interpreted accordingly, i.e. the first pollutant is in fact not present.

In embodiments, the idea is to switch off the air sensor or air purifier according to activity status information of the home appliance because some home appliance may cause sensor reading increasing but actually the generated particulate is not harmful; in this case, the filter function can be switched off without switching off the home appliance or opening the window. By this way, the sensor/air purifier's lifetime can be increased and the air quality is not compromised.

For the example of an air purifier, the resulting operation of the air purifier may comprise any one of the following:
  switching on the air purifier;
  switching off the air purifier;
  increasing the air flow through the air purifier; and
  reducing the air flow through the air purifier.

The air flow can be increased or decreased by controlling a fan speed of the air purifier.

For the example of an air quality sensor, the resulting operation of the air quality sensor may comprises any one of the following:
  switching on the air quality sensor;
  switching off the air quality sensor;
  reducing the sampling rate of the air quality sensor; and
  increasing the sampling rate of the air quality sensor.

The sampling rate of the air quality sensor relates to the frequency with which sensor readings are taken. For some sensors, the act of taking sensor reading causes the pollutant to be driven past or through the sensor, which may cause contamination of sensor parts, such as optical components.

The home appliances which provide activity information are domestic appliances, and particularly ones which are known to generate air pollutants which may be sensed by the sensors used and/or which may result in required filtering by the filters used in the system.

The input is for example adapted to receive activity status information in respect of one or more of:
  a fat fryer;
  a cooking pot;
  an oven or stove;
  a microwave oven;
  a coffee maker;
  a cooker extraction hood;
  a vacuum cleaner;
  a room freshener dispenser;
  an iron.

Each of these domestic appliances generates/emits compounds that can be considered as air pollutants which therefore have an effect on the function of the air quality sensor and/or the air purifier.

In a first example, the controller is adapted to switch off the air quality sensor in response to activity of a fat fryer and/or increase the air flow through the air purifier. This extends the life of the air quality sensor. It is not needed to detect the increase in pollution since this is already known to the user.

In a second example, the controller is adapted to switch off the air purifier in response to activity of a vacuum cleaner. The vacuum cleaner will generate particles but there is no need to filter these, until the vacuuming is completed, since the vacuum operation is already performing a filtering function.

In a third example, the controller is adapted to increase the air flow through the air purifier in response to activity of an iron. This is to improve the filtering function. Filtering of the particles generated by ironing may result in a shortening of the life time of the particle filter, however these particles will also have health effects, so filtering of the particles is preferred over switching the air purifier off.

In a fourth example, an oven or stove indicates that it is being used. As a result, the relative humidity, the absolute number of particles, the volatile organic compound (VOC) concentration and particularly in the case of a stove, the temperature will increase. High relative humidity results in a larger apparent particle size, and software may be used to correct for this when interpreting sensor readings. As discussed further below, an additional use of the activity status information is to enhance the accuracy of sensor readings, and this is one example.

Due to the cooking event, the absolute number of particles will also increase, in an expected manner. Using knowledge of the pots which are in use on the stove (e.g. a fryer or wok or boiling pan) or the cooking trays used in the oven (e.g. an open roasting tray or a closed cooking pot) and their operation temperature, also the nature of the particles to be expected can be determined and corresponding action can be taken or a corresponding message can be communicated.

According to an embodiment of the invention, the air processing system comprises an air purifier. Determining the operational settings of the air processing device comprises: identifying from the activity status information a type of pollutant released by the home appliance in the air and selecting a filtration action of the air purifier depending on the identified type of pollutant. The air processing system is then operated with these determined operational settings.

Thus, the air purification action is tailored for the type of the pollutant. For example, when the cooking pot indicates an action, which also shows itself in a large number of particles which mostly consist of oily nature, then the filtration action is directed to a special section of the filter in order to maximize the lifetime of a high-efficiency particulate air (HEPA) filter. Alternatively, the system can also help to select the most appropriate cleaning action, especially when more than one type of air purification method is available, either as a part of the same appliance (e.g. an appliance with an electrostatic particle filter, and with a HEPA filter), or triggering appliances with different cleaning methods (e.g. switching on the electrostatic purifier, and switching off the purifier with HEPA filter, etc.) For example, the air processing system may be adapted to select an appropriate filtration action in response to the identified pollutant. Selecting an appropriate filtration action may be: selecting a filter that filters out the identified pollutant and filtering the air with that selected filter. Alternatively, selecting an appropriate filtration action may comprise changing the air flow in the air processing system to a filter that filters out the identified pollutant.

The air quality sensor may comprise a total volatile organic compound, i.e. TVOC, sensor, wherein the controller is adapted to switch off the TVOC sensor or reduce the sampling rate in response to the activity status information. This information may be supplemented with sensor information, for example which measures the corresponding rapid increase in TVOC sensor output. In this way, the activity status information is combined with changes in the sensor information in order to detect more reliably that a known polluting event is taking place. By turning off or slowing down the use of the sensor, this protects the sensor from high levels once they have been detected. Once an alarm has been generated or corrective action commenced, there is no need for repeated warnings.

The air quality sensor may comprise a particle sensor, wherein the controller is adapted to switch off the particle sensor or reduce the sampling rate in response to the activity status information. Again, this activity status information may be supplemented with sensor information, for example which measures the corresponding rapid increase in particle sensor output.

A particle sensor may be switched off or have a reduced sampling rate also based on the information for another sensor (e.g. a VOC sensor), and similarly a VOC sensor may be switched off or have a reduced sampling rate based on the information for another sensor (e.g. a particle sensor).

Again, once an alarm has been generated or corrective action commenced, there is no need for repeated warnings.

The system may further comprise environmental sensors selected from one or more of the following: relative humidity sensor, carbon dioxide sensor, and presence detection sensor, wherein the controller is further adapted to process the information from the environmental sensors. This additional information provides further support in confirming that activity status information is correct.

The invention also provides a home appliance network comprising:
a home air processing system as defined above;
a set of home appliances, each providing activity status information to the controller, wherein each home appliance has a network identification; and an output device for communicating to a user activities identified based on the activity status information and communicating the air purifier operation or the air quality sensor operation implemented by the controller.

The output device may provide advice to the user as well as updates, for example advice to open the window.

According to examples in accordance with an aspect of the invention, there is provided a method for controlling an air processing device, comprising:
receiving at a controller activity status information from a plurality of home appliances; determining from the activity status information operational settings of an air processing device; and operating the air processing device at the determined operational settings.

According to an embodiment of the invention, determining operational settings comprises identifying from the activity status information a type of pollutant released by one or more of the home appliances in the air and selecting a filtration action of the air purifier depending on the type of pollutant. In that same embodiment, operating the air processing device at the determined operational settings comprises operating the air purifier with the selected filtration action.

Operating the air processing device may comprise: operating an air purifier and/or operating an air quality sensor; and/or interpreting an air quality sensor information.

Thus, this method takes account of the use of home appliances in controlling a sensor and/or an air purifier.

The activity status information is for example in respect of one or more of:
a cooking pot;
a stove or oven;
a microwave oven;
a cooker extraction hood (in combination with one or more cooking pans);
a coffee maker
a vacuum cleaner;
a room freshener device;
an iron.

In general, operating the air processing device at the determined operational settings may comprise any one of the following:
switching on the air purifier;
switching off the air purifier;
increasing the air flow through the air purifier;
reducing the air flow through the air purifier;
switching on the air quality sensor;
switching off the air quality sensor;
reducing the sampling rate of the air quality sensor; and
increasing the sampling rate of the air quality sensor.

More specific examples of operating the air processing device at the determined operational settings may comprise:
switching off the air quality sensor in response to activity of a fat fryer and/or increasing the air flow through the air purifier;
switching off the air purifier in response to activity of a vacuum cleaner; or
increasing the air flow through the air purifier in response to activity of an iron.

According to an embodiment of the invention, the controller is adapted to determine from the activity status information whether particles released by the home appliance are harmful or non-harmful. This may be done by checking which home appliance transmitted the activity status information. This information is contained within the activity status information. If the particles are harmful, an appropriate filtration action to filter out the harmful particles from the air is activated. If the particles are non-harmful, appropriate action is taken to operate the air processing system at settings which prolong its lifetime.

Instead or as well as controlling the air quality sensor and/or air purifier, advice may simply be given to the consumer (for example to open the window) or information may be provided giving an indication to the consumer about the event detected.

These and other aspects of the invention will be apparent from and elucidated with reference to the embodiments described hereinafter.

BRIEF DESCRIPTION OF THE DRAWINGS

Examples of the invention will now be described in detail with reference to the accompanying drawings, in which.

DETAILED DESCRIPTION OF EMBODIMENTS

The invention provides an air processing system, e.g. a home air processing system, comprising an air purifier and/or an air quality sensor. They are controlled and/or the sensor data is interpreted in dependence on activity status information received from a plurality of home appliances. This may enable the operational life time of components in the air processing system to be extended, specifically the sensors and air purifier filters. It may also enable more accurate interpretation of sensor readings.

Figure 1:
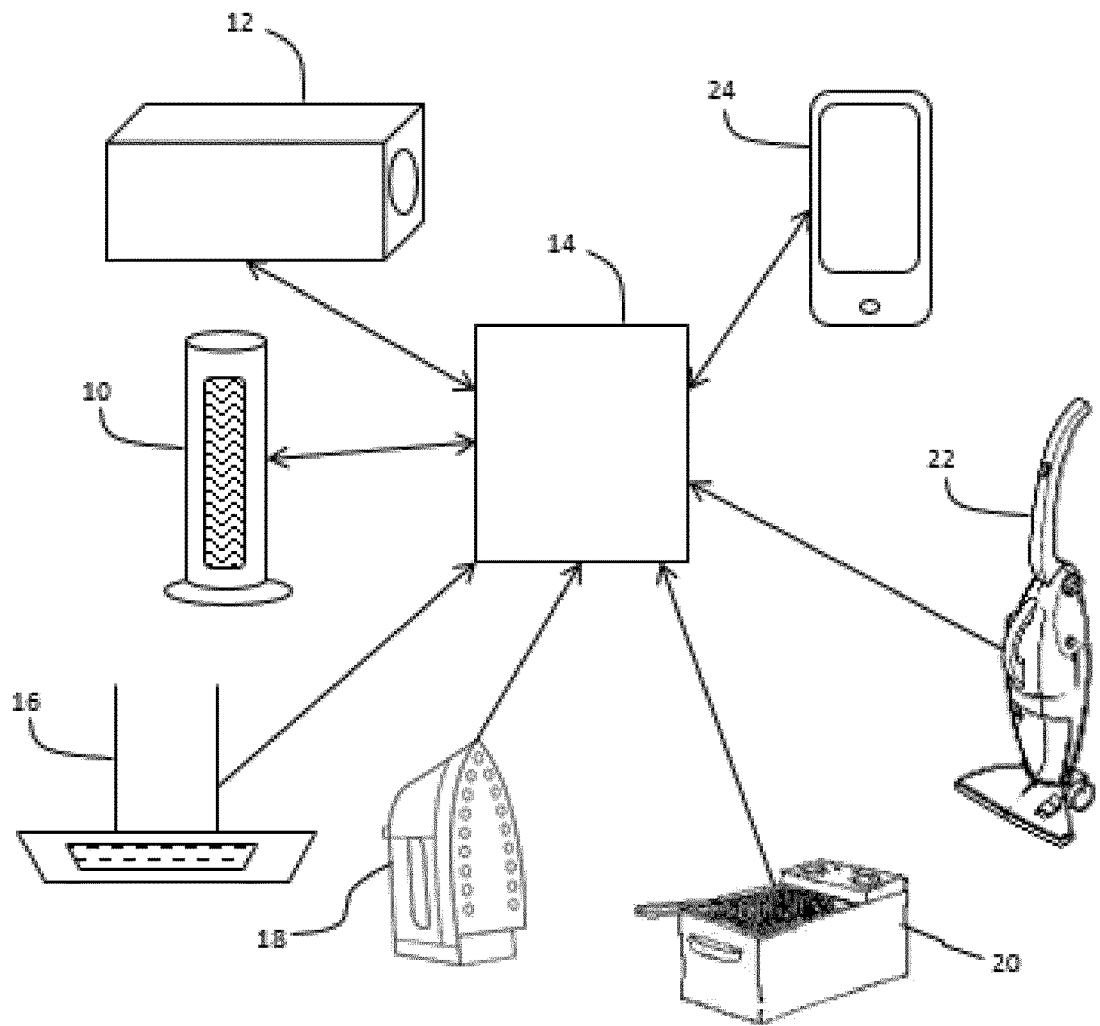
FIG. 1 shows a home air treatment system.

FIG. 1 shows a home air treatment system, comprising an air purifier 10, an air quality sensor 12 and a controller 14 for controlling the air purifier and the air quality sensor.

The air quality sensor 12 may comprise a sensor box or a set of sensor boxes located at different locations, or else it may comprise a part of the air purifier 10.

The controller receives inputs from a plurality of home appliances, and in particular activity status information is received. FIG. 1 shows home appliances in the form of a cooker hood 16, an iron 18, a fat fryer 20 and a vacuum cleaner 22. This is just a sample of the different possible devices which may together form the network. The controller operates the air purifier 10 and/or the air quality sensor 12 in dependence on the activity status information. The embodiments described in this disclosure are not limited to the particular home appliances as described in this disclosure. The embodiments as described cover any appliance that transmits activity status information.

According to an embodiment, the controller identifies the type of home appliance that is activated from the received activity status information. Based on the identified type of the home appliance, operational settings of the air processing system are determined. For example, particular operational settings that extend the life time of the air processing system. Such operational settings are known to a person skilled in the art. For example, extending the lifetime of the air processing system may comprise exposing an air filter of the air processing less to the pollutant expelled by the identified type of the home appliance. This may be done by, e.g. switching the air processing system off, or reducing the air flow rate or by any of the other techniques described in this disclosure. Alternatively, operational settings of the air processing system may be settings that activate the filtering out of the pollutant which is typically expelled by the identified type of the home appliance. For example, by selecting an appropriate filtration action such as selecting a filter which filters out the identified pollutant.

It is an important advantage of the invention that expensive particle sensors are not required while still achieving good filtration when one or more home appliances are activated. Also, it is a further advantage that the detection of a pollutant expelled by home appliances is detected immediately as the home appliance is switched on in contrast to the use of a particle sensor which senses the pollutant only when the pollutant is in the sensing range of the particle sensor.

There are other appliances or more general devices which may be networked, such as a frying pan, a candle or candelabra, or a lighter (as used for lighting a cigarette or a candle). These devices may also be designed to recognize and communicate when they are turned on and off. For example, a frying pan can sense that it is being used based on temperature sensing. The status of windows as open or closed may also be provided, since this affects the indoor aerosol concentration depending on outdoor pollution levels. Devices and appliances with a brushed motor also cause specific pollution.

The home appliances, the air purifier 10 and the sensor 12 are grouped by the controller 14 as a network. The controller 14 thus functions as a network controller. The communication to the controller may be wireless or wired, and the communication may for example piggy back over a WiFi or Bluetooth based network. Communication may also be made by adding information to the home used AC voltage system (for example by modulating it or adding low voltage information in the zero crossings of the AC voltage). Many other methods may be contemplated. Each home appliance has a unique identification and has a transmitter or transponder for communicating with the controller 14.

The communication is preferably bidirectional so that all devices can communicate with each other. They can be installed on the network using an installation protocol.

The communication may, however, be in one direction for some devices. For example, the vacuum cleaner may simply need to indicate when it is turned on. For some other devices, the communication may be bidirectional so that the controller 14 can issue commands as well as monitoring the activity. For example, the cooker hood may be controllable by the controller 14 and thus function as part of the overall air purification system.

There is bidirectional communication with the air purifier 10 and the sensor 12 so that the controller can control the operation of these devices.

The air purifier may be controlled to be on or off, and also it may be controlled at different fan speeds when turned on. The fan speed dictates the sampled air flow. It may also be controlled to use different filtering units depending on the detected event.

The sensor may also be controlled to be on or off, and also it may be operated with different sampling periods and data acquisition rates.

As soon as an appliance is in use, it communicates this to the controller 14. This constitutes activity status information. This may be used alone to provide control of the air quality sensor and/or the air purifier. However, the decision making process may also take account of the sensor information. For example, based additionally on the local circumstances as determined by the air quality sensor, automatic actions can then be taken. In accordance with a first aspect, the aim is to extend the lifetime of the components of the system.

The air quality sensor may comprise a particle sensor and/or a TVOC sensor and/or other sensors.

The system also comprises an output device 24, which may take the form of a mobile telephone, tablet or laptop which runs an application. The detected activity can thus be presented to the user, as well as an indication of the air purifier and sensor control measures that are being taken.

Some examples of the actions that can be taken in response to activity status will now be given.

If a fat fryer 20 is in use, the sensor 12 may be turned off to extend its life and/or the air purifier can be turned on or (if already on) the air flow through the air purifier may be increased, for example to full speed. This can prevent a significant reduction in the sensor lifetime.

Additional advisory information may be provided to the output device 24, for example a recommendation to open a window.

If a vacuum cleaner 22 is being used, the purifier may be turned off to protect the filters from the generated dust while vacuuming is taking place.

If an iron is being used, the air flow through the air purifier may be increased to improve the filtering function.

Once an increase in a particular pollutant has been detected by a sensor, in addition to the activity status information which explains the presence of that pollutant, there is a reduced need to report this repeatedly. For example, corrective action may have been started (e.g. ramping up the air purifier, opening a window) and some time is needed before another sensor reading will be of any further benefit.

The controller may thus switch off the sensor or reduce the sampling rate in response to the activity status information and/or a rapid increase in sensor output. This protects the sensor from high levels once they have been detected. This applies to a TVOC sensor or to a particle sensor or to other sensor types. This rapid rise in sensor output may correspond to events which correspond to a reported activity, but it may also correspond to other events, such as peeling an orange, or making coffee.

A microwave oven may be equipped with sensors and provide on/off information. The sensors may comprise temperature sensors, weighing sensors for detecting that there is food inside the oven, and door open/close sensors. The event which can be communicated to the sensor system may then comprise turning on, the temperature of use, and opening and closing of the door. The particle concentration will increase when the oven is turned on, when food to be treated is put inside the oven, and when opening the door. Likewise, oily droplets may be increased. The system can thus decide to ignore the increase of ultrafine particles and/or TVOCs, or to switch off the particle sensor to increase its lifetime. This can also be communicated to the consumer, by reporting the event detected and the sensor readings. By measuring with low sampling rate (immediately or after a predetermined time) and/or using information from the microwave oven again which indicates when it has cooled down, the system can decide when normal operation starts again.

A coffee maker may provide similar information, such as the on/off information, and information about the water flowing to produce coffee. TVOC concentration will increase, and this is expected by the consumer. Thus, the system can avoid the need to provide an alert indicating the increased particle sensing or TVOC sensing, and can communicate that no alert is being generated. The sensors can again be switched off for predetermined time or operated at a low sampling rate to increase lifetime. By measuring with low sampling rate and/or using information from the coffee maker again (indicating when it has cooled down, and no water is flowing), the system can decide when normal operation starts again.

For the example of a cooker extraction hood, on/off information is again provided, which is again indicative of an expected increase in particles and TVOCs. The sensors can again be switched off for a predetermined time, or be used with low sampling rate. Information about the extraction hood again can also be used to decide when normal operation starts again, for example when the extraction hood is turned off.

A room freshener dispenser may also communicate when it is being used to the controller to avoid measuring the expected sharp increase in particles and TVOCs. As explained above, the sensors can be switched off for a predetermined time or the sampling rate can be reduced.

An oven or stove may also indicate that it is being used. As a result, the relative humidity, the absolute number of particles, the VOC concentration and particularly in the case of a stove, the temperature will increase. Due to the cooking event, the absolute number of particles will also increase, in an expected manner. Using knowledge of the pots which are in use on the stove (e.g. a fryer or wok or boiling pan) or the cooking trays used in the oven (e.g. an open roasting tray or a closed cooking pot) and their operation temperature, also the nature of the particles to be expected can be determined and corresponding action can be taken or a corresponding message can be communicated.

In these examples, for non-harmful pollution, the filter function can be switched off during the detected event and switched on after the detected event. For example when the measured values have normalized again, the filter function may be resumed. The filter function may be resumed when the particle concentrations or TVOC measurements are not more than 100% higher, or 50% higher, or 25% higher than the normal level. The filtering may resume a fixed time after the normal levels have returned (such as 5 minutes, or 10 minutes, or 15 minutes). This avoids the need to filter when the pollution is known not to be harmful.

Similarly, if the pollution caused by the detected event is known to be harmful, the filter function may be ramped up during the detected event, and returned to normal after the detected event.

In all these examples, a coarse measurement of the particle size distribution can be used as an additional mechanism for event detection, in addition to the activity status information. The better the particle sensor(s) are, the more reliable this is. By using sensor measurements in addition to the activity status information, different information sources can be combined to enable more reliable event detection. This information can be communicated to the consumer (the event detected, the nature of the event, the actions taken). The action can be to stop sampling for some time and indicate this, or to sample with a reduced frequency, and communicate this to consumer. When measurement results no longer vary strongly (and/or the distribution is as before the event, within specified limits), the system can resume normal operation. Thus, the action which is taken in response to a detected event may end at a time derived from the activity information and also the sensor information.

Figure 2:
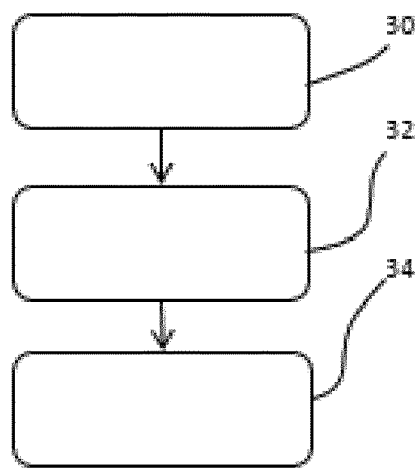
FIG. 2 shows a home air treatment method.

In another example, the air purification action may be tailored for the type of the pollutant. For example, when a cooking pot indicates an action, which results in a large number of particles which mostly consist of oily nature, then the filtration action may then be directed to a special section of the filter in order to maximize the lifetime of a high-efficiency particulate air (HEPA) filter. The system may also help select the most appropriate cleaning action, especially when more than one type of air purification method is available, either as a part of the same appliance (e.g. an appliance with an electrostatic particle filter, and with a HEPA filter), or triggering appliances with different cleaning methods (e.g. switching on the electrostatic purifier, and switching off the purifier with HEPA filter, etc.) FIG. 2 shows a home air treatment method, comprising in step 30, receiving activity status information from the plurality of home appliances at the controller. In step 32 the air purifier and/or the air quality sensor are controlled in dependence on the activity status information. Output information is provided to the user in step 34.

The air purifier may be a static system, but it may also be mobile. For example, it may comprise a robot device, which is able to roam within the indoor environment towards the source of pollution, in a similar way to a robot vacuum cleaner. The movement may then be controlled in dependence on the received activity information. It may for example move to the known location of the fat fryer in response to activity of the fat fryer, or it may move towards an open window to filter incoming air. Open/close detectors for doors and windows may be provided as part of the networked system.

The examples above are based on the use of activity status of home appliances to control the air purifier and air quality sensor in particular to extend the lifetime.

In accordance with a second aspect, the same system configuration may be used to improve the interpretation of detector or sensor results. Presented is a detector for detecting a particular gas or particle type. The detector comprises a gas or a particle sensor. The detector further comprises a controller. The controller comprises an input adapted to receive activity status information from a home appliance. The controller is further arranged to detect the particular gas or particle type using the combined data from: 1) the sensor and 2) the activity status information. It is an advantage of the invention that the accuracy of a gas or particle detector is increased without actually changing or replacing the sensor of the detector. Hence, it allows cheaper detectors to be used in a wider range of applications which reduces cost.

The system makes use of the fact that more and more devices and appliances used in the home (and at public and professional spaces, etc.) have a unique ID such as an IP address, or an RFID identity. The network may include appliances as well as other devices which have a status (like window and doors). While doors and windows do not create pollutants in themselves, they can influence the pollutant levels, and thus can provide useful activity status information. Other sensors may be used to assist in the interpretation of the activity status information and the air quality sensor information. For example, environmental sensors may be provided selected from one or more of the following: relative humidity sensor, carbon dioxide sensor, and presence detection sensor. The controller is then further adapted to process the information from the environmental sensors. This additional information provides further support in confirming that activity status information is correct and is causing the expected increase in pollutants. For example, the temperature increase and relative humidity increase at a cooker hob confirms that the cooker hob is in use, which may already have been reported by the corresponding activity status information.

The use of a large number of sensors in distributed sensor networks enables a significant improvement in spatial and temporal data coverage. However, using an increased number of sensors, especially for consumer applications, can only be done by using low cost and therefore functionally compromised sensors. These sensors for example have compromised quality, speed, operational range or selectivity.

A lack of selectivity (i.e. cross-sensitivity) is a particular issue. For example, a low cost gas sensor claimed to be specific for a certain gas also responds to other gases. Taking a formaldehyde sensor as an example, various types of alcohol, other types of aldehydes, CO, and $SO_2$ (and many more) also cause a sensor response. This limits the applicability of these types of sensors due to false positives and false negatives because of lack of selectivity, and also causes sensitivity issues as other gases at least contribute to the background levels.

In the case of an optical particle sensor, the accuracy of the particle count to mass concentration conversion (i.e. from counts/liter to $\mu g/m^3$) strongly depends on the type of the aerosol the sensor detects at a given time. This intrinsic conversion error is a combined result of the optical properties of the particle (such as the refractive index, absorption/reflection, surface condensation and surface roughness), and the physicochemical properties (such as the density and porosity). Without knowing the type of aerosol, all optical sensor systems operate with relatively large error margins, which easily reach a factor of 4 to 6.

This problem is likely to increase with the trend for increasing numbers of sensors in a distributed network, such as the so-called Internet of Things.

By using the activity status information of home appliances, as described above, it is possible to make an identification of the origin of the analyte that triggers the sensor output, for example increased gas and/or particle concentration.

Examples of the types of device and appliance which contribute to indoor volatile organics and particles have been given above.

By using activity status information in respect of these home appliances, for example, a binary on/off information, it is possible to identify the source of the pollutant, hence improve the interpretation accuracy of the sensor data received from the sensor that responds to the action of these appliances.

Furthermore, almost all electric home appliances have a unique signature in their electricity consumption patterns (e.g. current drawn, superimposed voltage pattern on top of the regular AC pattern, etc.). A system that provides this information can also be used either instead of, or complementary to, the activity status information of an individual device/home appliance.

To provide the desired activity status information, there are various options. Activity status (on/off) information may be obtained directly from the on/off button of a home appliance, or from a sub-system that is connected to the on/off button of a particular appliance. The appliance may communicate over the power supply, for example, during the zero-crossings of the AC voltages, during which low power signals can be sent. Also other data could be sent, e.g. the temperature at which the appliance is operated. To monitor current usage by an appliance, an interface may be placed between the power plug of the appliance and the mains socket, which interface is capable of monitoring the current flow.

Another approach is to infer use of an appliance based on its location. For example an RFID tag may communicate with an RFID receiver when the RFID tag is located at a specific location in the home. An RFID tag on a frying pan may for example be monitored by one transceiver unit at a cupboard, and one on the stove hob.

An appliance may be provided with a wireless communication unit (e.g. Wi-Fi, Bluetooth, ZigBee, etc.) that switches on when the appliance is on, and/or transmits status information when the appliance is on and off.

An acoustic communication unit may be used, for example to generate a specific sound pattern that is unique for the appliance. Alternatively, an appliance may already have specific sound pattern which can be used to convey activity status information.

For doors and windows, a sensor may be placed on the windows or doors. The status of a door or window as open or closed will influence the concentration of a target analyte in that environment, by means of dilution, and ventilation.

Some appliances may be provided with a user interface that allows a user to select the status information and send this information to the controller.

The information received by the sensor can then be interpreted taking account of the activity status information. The controller 14 has a signal and data processing unit for the front end processing of the sensor signals so that the sensed conditions can be interpreted more accurately by using the activity status information. The controller 14 stores the sensed data as well as the activity status information storing data for a sufficient time frame for calculations.

In order to enable suitable interpretation of the sensor data, the controller includes a memory unit for storing reference data (for example in the form of a lookup table) about the contribution of different appliances on the type of the pollutants or parameters generated by the sensors.

The controller then uses the activity status information to access the corresponding reference data in the memory, and then makes a more accurate calculation of the concentration of the analyte from the sensor signal, by using the information about the type of the analyte(s) generated by the given appliance. The accurate concentration information may then be communicated to the user.

This method can be applied at step 32 in FIG. 2. Instead of, or as well as, controlling the air purifier and/or the air quality sensor in dependence on the activity status information, the sensor outputs are interpreted using this information, so that the more accurate sensor output information may be provided to the user in step 34.

The networked approach also allows the system controller to check the status of the individual sensors used in the system. By gathering information from a number of sensors, it can be deduced if one or more sensors is defective or in need of maintenance. This is possible as a result of a degree of redundancy, which enables the expected sensor output from one sensor to be predicted to some extent from the outputs of the other sensors.

Several examples of household appliance have been given above which may influence the way the purifier system is controlled. Other examples include a wok, a toaster, a bread oven, and indeed any other cooking appliances. Various cleaning appliances also may be networked such as a steam cleaner.

Other variations to the disclosed embodiments can be understood and effected by those skilled in the art in practicing the claimed invention, from a study of the drawings, the disclosure, and the appended claims. An air purifier and an air quality sensor are examples of an air processing device that would benefit from the present invention. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An air processing system, comprising:
a controller for controlling the air processing system,
an air quality sensor having a sampling rate that relates to a frequency with which sensor readings are taken,
wherein the controller comprises an input adapted to receive activity status information from a home appliance, and
wherein the controller is arranged for:
  determining from the activity status information operational settings of the air processing system; and
  operating the air processing system using the determined operational settings, wherein operating the air processing system using the determined operational settings comprises:
reducing the sampling rate of the air quality sensor from a base sampling rate in response to the activity status information being indicative of the home appliance being active or ON; and
increasing the sampling rate of the air quality sensor to the base sampling rate in response to the activity status information being indicative of the home appliance being non-active or OFF.

2. The air processing system as claimed in claim 1, further comprising an air purifier, and wherein operating the air processing system using the determined operational settings comprises any one of the following:
switching on the air purifier;
switching off the air purifier;
increasing an air flow through the air purifier; and
reducing the air flow through the air purifier.

3. The air processing system according to claim 1, further comprising an air purifier, wherein determining from the activity status information operational settings of the air processing device comprises: identifying from the activity status information a type of pollutant released by the home appliance in the air and selecting a filtration action of the air purifier depending on the identified type of pollutant, and wherein operating the air processing system using the determined operational settings comprises: operating the air purifier with the selected filtration action.

4. The air processing system as claimed in claim 1, wherein the input is adapted to receive activity status information in respect of one or more of:
a fat fryer;
a vacuum cleaner;
a cooking pot;
an oven or stove;
a microwave oven;
a coffee maker;
a cooker extraction hood;
a room freshener dispenser; and
an iron.

5. The air processing system as claimed in claim 1, further comprising the air quality sensor and an air purifier, wherein the controller is adapted to switch off the air quality sensor or reduce the sampling rate of the air quality sensor and/or increase the air flow through the air purifier in response to activity of a fat fryer.

6. The air processing system as claimed in claim 1, further comprising an air purifier, wherein the controller is adapted to switch off the air purifier in response to activity of a vacuum cleaner.

7. The air processing system as claimed in claim 1, further comprising an air purifier, wherein the controller is adapted to increase the air flow through the air purifier in response to activity of an iron.

8. The air processing system as claimed in claim 1, wherein the controller is coupled to receive outputs from at least one environmental sensor selected from the group consisting of: a relative humidity sensor, a carbon dioxide sensor, and a presence detection sensor, wherein the controller is further adapted to process information from the at least one environmental sensor.

9. The air processing system as claimed in claim 1, wherein operating the air processing system using the determined operational settings further comprises any one of the following:
switching on the air quality sensor; and
switching off the air quality sensor.

10. The air processing system as claimed in claim 9, wherein the controller is coupled to receive outputs from at least one environmental sensor selected from the group consisting of: a relative humidity sensor, a carbon dioxide sensor, and a presence detection sensor, and wherein the controller is further adapted to determine the operational settings in response to information from the at least one environmental sensor.

11. A method for controlling an air processing device, comprising:
receiving at a controller activity status information from a plurality of home appliances;
determining from the activity status information operational settings of an air processing device; and
operating the air processing device at the determined operational settings, wherein operating the air processing device at the determined operational settings comprises:
reducing a sampling rate of an air quality sensor from a base sampling rate in response to the activity status information being indicative of the home appliance being active or ON; and
increasing the sampling rate of the air quality sensor to the base sampling rate in response to the activity status information being indicative of the home appliance being non-active or OFF, wherein the sampling rate relates to a frequency with which sensor readings are taken.

12. A method as claimed in claim 11, wherein the activity status information is in respect of one or more of:
a fat fryer;
a cooking pot;
an oven or stove;
a microwave oven;
a coffee maker;
a vacuum cleaner;
a cooker extraction hood;
a room freshener dispenser; and
an iron.

13. A method as claimed in claim 11, wherein operating the air processing device at the determined operational settings comprises any one of the following:
switching on an air purifier;
switching off the air purifier;
increasing the air flow through the air purifier; and
reducing the air flow through the air purifier.

14. A method as claimed in claim 13, comprising:
switching off the air quality sensor in response to activity of a fat fryer and/or increasing the air flow through the air purifier, in response to activity of the fat fryer.

15. A method as claimed in claim 11, further comprising:
monitoring a total volatile organic compound amount using a total volatile organic compound sensor, and switching off the total volatile organic compound sensor or reducing a sampling rate of the total volatile organic compound sensor in response to the activity status information; and/or
monitoring a particle concentration using a particle sensor, and switching off the particle sensor or reducing a sampling rate of the particle sensor in response to the activity status information.

16. A method according claim 11, wherein the air processing device comprises an air purifier, wherein determining from the activity status information operational settings of an air processing device comprises: identifying from the activity status information a type of pollutant released by one or more of the home appliances in the air and selecting a filtration action of the air purifier depending on the type of pollutant, and wherein operating the air processing device at the determined operational settings comprises: operating the air purifier with the selected filtration action.

17. A method as claimed in claim 12, comprising:
switching off an air purifier in response to activity of a vacuum cleaner; or
increasing an air flow through the air purifier in response to activity of an iron.

18. A method as claimed in claim 11, operating the air processing device at the determined operational settings further comprises any one of the following:
switching on the air quality sensor; and
switching off the air quality sensor.

19. A method as claimed in claim 18, further comprising:
monitoring a total volatile organic compound amount using a total volatile organic compound sensor, and switching off the total volatile organic compound sensor or reducing a sampling rate of the total volatile organic compound sensor in response to the activity status information; and/or
monitoring a particle concentration using a particle sensor, and switching off the particle sensor or reducing a sampling rate of the particle sensor in response to the activity status information.

20. A method according claim 18, wherein the air processing device comprises an air purifier, wherein determining from the activity status information operational settings of an air processing device comprises: identifying from the activity status information a type of pollutant released by one or more of the home appliances in the air and selecting a filtration action of the air purifier depending on the type of pollutant, and wherein operating the air processing device at the determined operational settings comprises: operating the air purifier with the selected filtration action.

* * * * *